(12) United States Patent
Miyashita et al.

(10) Patent No.: US 10,714,252 B2
(45) Date of Patent: Jul. 14, 2020

(54) INDUCTOR AND DC-DC CONVERTER

(71) Applicant: Murata Manufacturing Co., Ltd., Nagaokakyo-shi, Kyoto-fu (JP)

(72) Inventors: Munetake Miyashita, Nagaokakyo (JP); Yuji Tamura, Nagaokakyo (JP); Takayuki Tange, Nagaokakyo (JP); Hideaki Hashi, Nagaokakyo (JP); Takeshi Wake, Nagaokakyo (JP); Yasuhiro Higashide, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 0 days.

(21) Appl. No.: 16/438,516

(22) Filed: Jun. 12, 2019

(65) Prior Publication Data
US 2019/0295761 A1 Sep. 26, 2019

Related U.S. Application Data

(63) Continuation of application No. PCT/JP2017/042847, filed on Nov. 29, 2017.

(30) Foreign Application Priority Data

Dec. 28, 2016 (JP) ................................ 2016-255762

(51) Int. Cl.
*H01F 27/29* (2006.01)
*H01F 27/245* (2006.01)
(Continued)

(52) U.S. Cl.
CPC ........... *H01F 27/245* (2013.01); *H01F 17/00* (2013.01); *H01F 17/04* (2013.01); *H01F 27/24* (2013.01);
(Continued)

(58) Field of Classification Search
CPC ............................. H01F 5/00; H01F 27/00–36
(Continued)

(56) References Cited

U.S. PATENT DOCUMENTS

| 2015/0235753 A1 | 8/2015 | Chatani et al. |
| 2017/0345552 A1 | 11/2017 | Nakano et al. |

FOREIGN PATENT DOCUMENTS

| JP | 4-368105 A | 12/1992 |
| JP | 2013-243330 A | 12/2013 |

(Continued)

OTHER PUBLICATIONS

Official Communication issued in International Patent Application No. PCT/JP2017/042847, dated Jan. 9, 2018.

*Primary Examiner* — Tuyen T Nguyen
(74) *Attorney, Agent, or Firm* — Keating & Bennett, LLP (57) ABSTRACT

An inductor includes a first terminal and a second terminal, a first inductor conductor layer and a second inductor conductor layer, a magnetic core layer, and via conductors. The magnetic core layer is disposed between the first and second inductor conductor layers. The via conductors are connected to the first and second inductor conductor layers. The first and second terminals are electrically connected through the via conductors. The magnetic core layer includes a first magnetic substance portion including a first magnetic substance, and a second magnetic substance portion including a second magnetic substance. Magnetic properties of the second magnetic substance are different from magnetic properties of the first magnetic substance.

20 Claims, 11 Drawing Sheets

(51) Int. Cl.
*H01F 17/04* (2006.01)
*H01F 27/28* (2006.01)
*H01F 41/02* (2006.01)
*H02M 3/155* (2006.01)
*H01F 27/24* (2006.01)
*H01F 17/00* (2006.01)
*H02M 1/00* (2006.01)

(52) U.S. Cl.
CPC ......... *H01F 27/2804* (2013.01); *H01F 27/29* (2013.01); *H01F 41/0233* (2013.01); *H02M 3/155* (2013.01); *H02M 2001/0009* (2013.01)

(58) Field of Classification Search
USPC ... 336/65, 83, 200, 206–208, 212, 220–223, 336/232–234
See application file for complete search history.

(56) References Cited

FOREIGN PATENT DOCUMENTS

| | | | |
|---|---|---|---|
| JP | 2016-157890 A | | 9/2016 |
| JP | 2016157890 A | * | 9/2016 |
| JP | 2017-17223 A | | 1/2017 |
| JP | 2017-212372 A | | 11/2017 |
| WO | 2016/059918 A1 | | 4/2016 |

* cited by examiner

INDUCTOR AND DC-DC CONVERTER

CROSS REFERENCE TO RELATED APPLICATIONS

This application claims the benefit of priority to Japanese Patent Application No. 2016-255762 filed on Dec. 28, 2016 and is a Continuation Application of PCT Application No. PCT/JP2017/042847 filed on Nov. 29, 2017. The entire contents of each application are hereby incorporated herein by reference.

BACKGROUND OF THE INVENTION

1. Field of the Invention

The present invention relates to an inductor including, in a magnetic core, a plurality of magnetic substances having magnetic properties different from each other, and a DC-DC converter including the inductor.

2. Description of the Related Art

In the related art, when a plurality of magnetic substances having magnetic properties different from each other define a magnetic core, an inductor enables a desired change in inductance with respect to a direct current (direct-current superposition characteristics). Hereinafter, a magnetic core including a plurality of magnetic substances having magnetic properties different from each other is also referred to as a composite magnetic core.

For example, Japanese Unexamined Patent Application Publication No. 2016-157890 discloses a coil component (inductor) including, as a composite magnetic core, a plurality of toroidal magnetic cores that have different effective magnetic permeabilities and are disposed so as to be concentrically stacked with a space provided therebetween and in which a common coil is mounted. The coil component has high inductance in a region in which a DC superimposed current is small and is able to maintain inductance at a low inductance value in a region in which the DC superimposed current is large.

The coil component disclosed in Japanese Unexamined Patent Application Publication No. 2016-157890 is assembled using, as a basis, a coil winding frame to reduce a displacement between the toroidal magnetic cores. In the case in which a structure for winding a conductor around a composite magnetic core is necessary as in the inductor disclosed in Japanese Unexamined Patent Application Publication No. 2016-157890, manufacturing costs of an inductor may increase.

SUMMARY OF THE INVENTION

Preferred embodiments of the present invention provide a reduction in manufacturing costs of inductors including a composite magnetic core.

An inductor according to a preferred embodiment of the present invention includes first and second terminals; first and second inductor conductor layers; a magnetic core layer; and first and second via conductors. The magnetic core layer is disposed between the first inductor conductor layer and the second inductor conductor layer. The first and second via conductors are connected to the first and second inductor conductor layers. The first and second terminals are electrically connected through the first and second via conductors. The magnetic core layer includes a first magnetic substance portion including a first magnetic substance, and a second magnetic substance portion including a second magnetic substance. Magnetic properties of the second magnetic substance are different from magnetic properties of the first magnetic substance.

In an inductor according to a preferred embodiment of the present invention, in a process in which the first inductor conductor layer, the magnetic core layer, and the second inductor conductor layer are laminated, when the first inductor conductor layer and the second inductor conductor layer are connected by the first and second via conductors, a structure is provided in which the magnetic core layer is wound with the first inductor conductor layer, the first via conductor, the second inductor conductor layer, and the second via conductor.

In inductors according to preferred embodiments of the present invention, a structure for winding a conductor around the magnetic core layer, which is a composite magnetic core, is unnecessary. As a result, manufacturing costs of the inductors are able to be reduced.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Preferred embodiments of the present invention will be described in detail below with reference to the drawings. Note that the same or corresponding elements or portions in the drawings are denoted by the same reference signs and a repeated description thereof is not provided.

Preferred Embodiment 1

Figure 1:
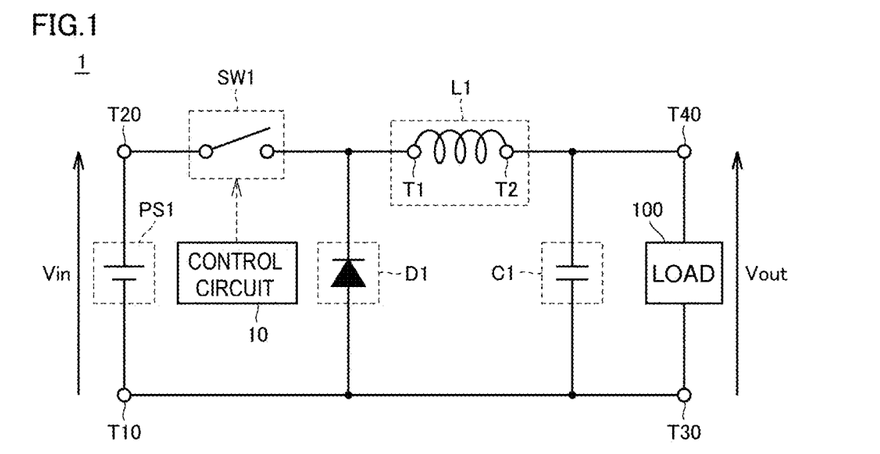
FIG. 1 illustrates an example of a circuit diagram of a DC-DC converter according to a Preferred Embodiment 1 of the present invention.

FIG. 1 illustrates an example of a circuit diagram of a DC-DC converter 1 according to a Preferred Embodiment 1 of the present invention. As illustrated in FIG. 1, the DC-DC converter 1 is a step-down DC-DC converter defined by a step-down chopper circuit. The DC-DC converter 1 reduces an input voltage Vin to an output voltage Vout and outputs the output voltage Vout to a load 100. The step-down chopper circuit includes, as a choke coil, an inductor L1.

The DC-DC converter 1 includes input terminals T10 and T20, a switch SW1, a control circuit 10, a diode D1, the inductor L1 including a composite magnetic core, a capacitor C1, and output terminals T30 and T40.

The input terminals T10 and T20 are respectively connected to a negative terminal and a positive terminal of a direct-current power supply PS1. The input voltage Vin is input between the input terminals T10 and T20 by the direct-current power supply PS1. The switch SW1 is switched between conduction and non-conduction by the control circuit 10. A cathode of the diode D1 is connected to the input terminal T20 through the switch SW1. An anode of the diode D1 is connected to the input terminal T10.

An input-output terminal T1 of the inductor L1 is connected to the cathode of the diode D1. An input-output terminal T2 of the inductor L1 is connected to the output terminal T40. The inductor L1 includes a composite magnetic core. Direct-current superposition characteristics of the inductor L1 are characteristics in which the inductance with respect to a relatively smaller current value (low load region) than a rated current of the DC-DC converter 1 is large and in which the inductance with respect to a larger current value (overcurrent region) than the rated current is maintained so as not to fall below a lower limit. The direct-current superposition characteristics of the inductor L1 will be described in detail below with reference to FIGS. 4 to 6.

One end of the capacitor C1 is connected to the output terminal T30. The other end of the capacitor C1 is connected to the output terminal T40. The load 100 is connected between the output terminals T30 and T40. The output voltage Vout is output to the load 100. The capacitor C1 is a smoothing capacitor to reduce variations in the output voltage Vout and stabilize the output voltage Vout.

When the switch SW1 is conducting, a current is led from the direct-current power supply PS1 to the load through the inductor L1, and energy is accumulated in the inductor L1. When the switch SW1 is non-conducting, energy is released from the inductor L1, and a current from the diode D1 is led to the load 100 through the inductor L1. When the switch SW1 is rapidly switched between conduction and non-conduction, the output voltage Vout is reduced to a desired value.

Figure 2:
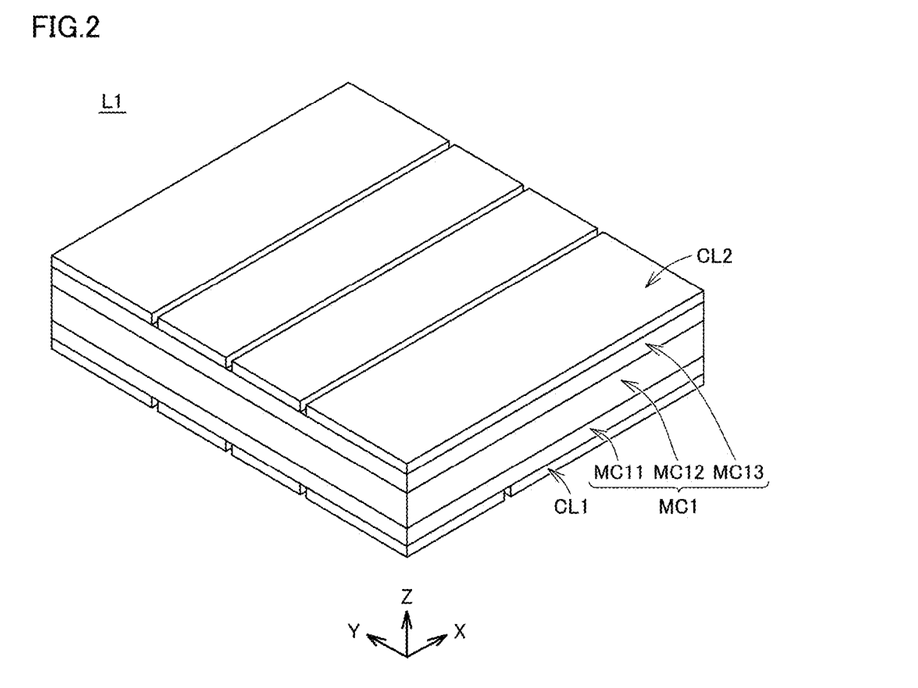
FIG. 2 is an external perspective view of an inductor in FIG. 1.

FIG. 2 is an external perspective view of the inductor L1 in FIG. 1. As illustrated in FIG. 2, the inductor L1 is a multilayer body in which an inductor conductor layer CL1, a magnetic core layer MC1, and an inductor conductor layer CL2 are laminated in a lamination direction (Z-axis direction).

The magnetic core layer MC1 is disposed between the inductor conductor layers CL1 and CL2. The magnetic core layer MC1 includes a magnetic substance portion MC11 including a magnetic substance MS1, a magnetic substance portion MC12 including a magnetic substance MS2, and a magnetic substance portion MC13 including the magnetic substance MS1. In the lamination direction, the magnetic substance portion MC12 is disposed between the magnetic substance portions MC11 and MC13. The magnetic substance portion MC11 is disposed between the magnetic substance portion MC12 and the inductor conductor layer CL1. The magnetic substance portion MC13 is disposed between the magnetic substance portion MC12 and the inductor conductor layer CL2. A width of the magnetic substance portion MC11 in the lamination direction (Hereinafter the width is simply referred to as "thickness".) is equal or substantially equal to a thickness of the magnetic substance portion MC13. Magnetic properties of the magnetic substance MS1 differ from magnetic properties of the magnetic substance MS2. Examples of magnetic properties of a magnetic substance include properties about magnetic permeability, magnetic saturation, and saturation magnetic flux density, for example.

The magnetic core layer MC1 of the inductor L1 includes a plurality of magnetic substance portions MC11 to MC13 that are independent of one another. In the case in which a structure for winding a conductor around the magnetic substance portions MC11 to MC13 is necessary, manufacturing costs of the inductor L1 are increased.

In the Preferred Embodiment 1, the magnetic core layer MC1 is disposed between the inductor conductor layers CL1 and CL2 that have a layer structure, and the inductor conductor layers CL1 and CL2 are connected by a plurality of via conductors. In a process in which the inductor conductor layer CL1, the magnetic core layer MC1, and the inductor conductor layer CL2 are laminated, when the inductor conductor layers CL1 and CL2 are connected by a plurality of via conductors, a structure is provided in which the magnetic core layer MC1 is wound with the inductor conductor layer CL1, the inductor conductor layer CL2, and the plurality of via conductors. In the inductor L1, a structure for winding a conductor around the magnetic core layer MC1 is unnecessary. As a result, manufacturing costs of the inductor L1 are reduced.

Figures 3A, 3B, 3C, 3D, 3E:
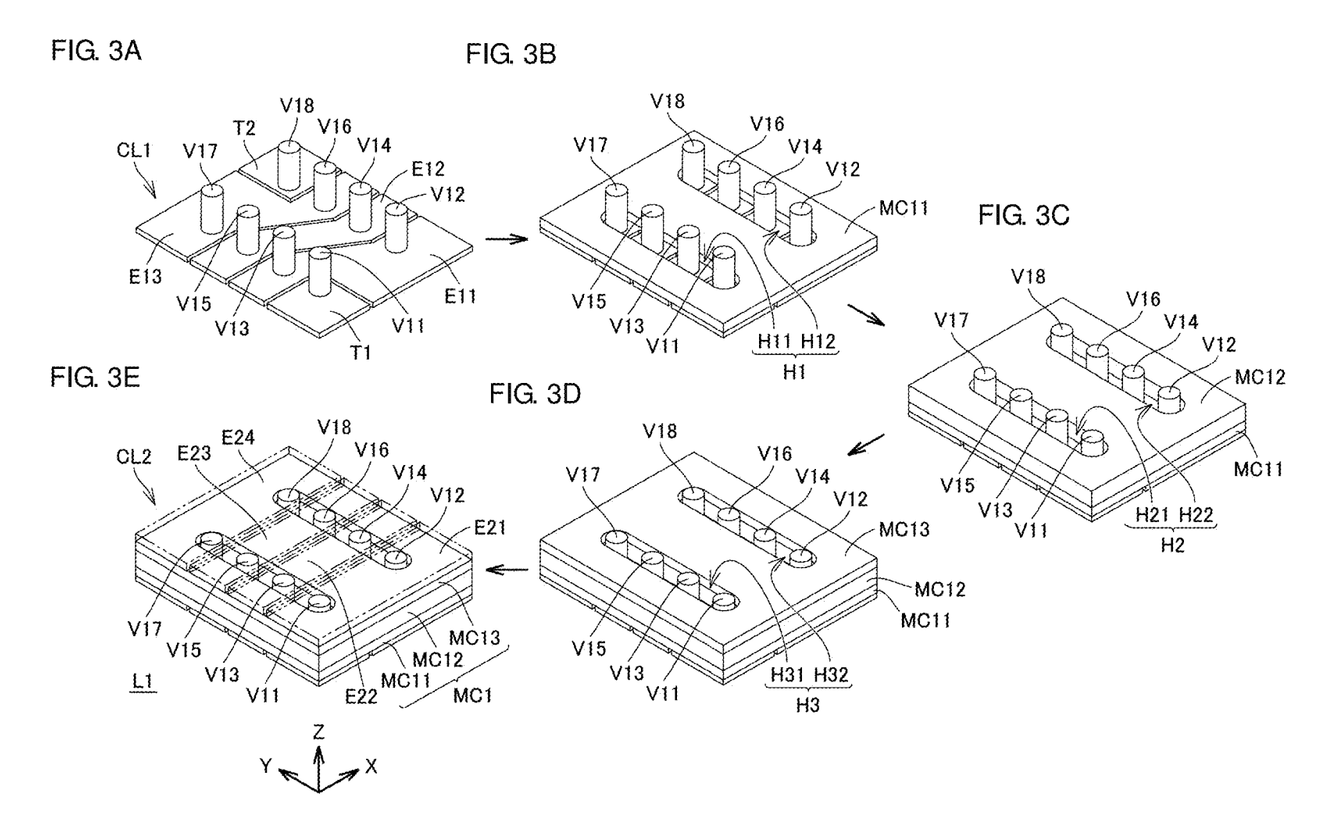
FIGS. 3A to 3E illustrate a lamination process of laminating layers included in the inductor in FIG. 2.

FIGS. 3A to 3E illustrate a lamination process of laminating layers included in the inductor L1 in FIG. 2. The lamination process of laminating the layers included in the inductor L1 proceeds in the order of FIGS. 3A to 3E. As illustrated in FIG. 3A, the inductor conductor layer CL1 includes the input-output terminals T1 and T2, and a plurality of line conductors E11 to E13.

The inductor conductor layer CL1 preferably has a rectangular or substantially rectangular shape, for example. The input-output terminals T1 and T2 are disposed on a diagonal line. The line conductors E11 to E13 are disposed between the input-output terminals T1 and T2.

The input-output terminal T1 is adjacent to the line conductor E11. A gap is provided between the input-output terminal T1 and the line conductor E11, and the input-output terminal T1 is therefore not in contact with the line conductor E11. The line conductor E12 is disposed between the line conductors E11 and E13 and is adjacent to the line conductors E11 and E13. A gap is provided between the line conductors E11 and E12, and the line conductor E11 is therefore not in contact with the line conductor E12. A gap is provided between the line conductors E12 and E13, and the line conductor E12 is therefore not in contact with the line conductor E13. The input-output terminal T2 is adjacent to the line conductor E13. A gap is provided between the input-output terminal T2 and the line conductor E13, and the input-output terminal T2 is therefore not in contact with the line conductor E13.

A via conductor V11 extends in the Z-axis direction from the input-output terminal T1. Via conductors V12 and V13 extend in the Z-axis direction from the line conductor E11. Via conductors V14 and V15 extend in the Z-axis direction from the line conductor E12. Via conductors V16 and V17 extend in the Z-axis direction from the line conductor E13. A via conductor V18 extends in the Z-axis direction from the input-output terminal T2.

The via conductors V11, V13, V15, and V17 are linearly disposed at intervals in a Y-axis direction. The via conductors V12, V14, V16, and V18 are linearly disposed at intervals in the Y-axis direction. There are spaces between the linearly disposed via conductors V11, V13, V15, and V17 and the linearly disposed via conductors V12, V14, V16, and V18. The via conductors V11 to V18 are not in contact with one another.

As illustrated in FIG. 3B, the magnetic substance portion MC11 is laminated on the inductor conductor layer CL1. In the magnetic substance portion MC11, a hole portion H1 is provided. The hole portion H1 includes holes H11 and H12. The via conductors V11, V13, V15, and V17 extend through the hole H11. There is a gap between each of the via conductors V11, V13, V15, and V17 and the side of the hole H11, and the via conductors V11, V13, V15, and V17 therefore extend through the hole H11 without being in contact with the magnetic substance portion MC11. The via conductors V12, V14, V16, and V18 extend through the hole H12. There is a gap between each of the via conductors V12, V14, V16, and V18 and the side of the hole H12, and the via conductors V12, V14, V16, and V18 therefore extend through the hole H12 without being in contact with the magnetic substance portion MC11.

As illustrated in FIG. 3C, the magnetic substance portion MC12 is laminated on the magnetic substance portion MC11. In the magnetic substance portion MC12, a hole portion H2 is provided. The hole portion H2 includes holes H21 and H22. The via conductors V11, V13, V15, and V17 extend through the hole H21. There is a gap between each of the via conductors V11, V13, V15, and V17 and the side of the hole H21, and the via conductors V11, V13, V15, and V17 therefore extend through the hole H21 without being in contact with the magnetic substance portion MC12. The via conductors V12, V14, V16, and V18 extend through the hole H22. There is a gap between each of the via conductors V12, V14, V16, and V18 and the side of the hole H22, and the via conductors V12, V14, V16, and V18 therefore extend through the hole H22 without being in contact with the magnetic substance portion MC12.

As illustrated in FIG. 3D, the magnetic substance portion MC13 is laminated on the magnetic substance portion MC12. In the magnetic substance portion MC13, a hole portion H3 is provided. The hole portion H3 includes holes H31 and H32. The via conductors V11, V13, V15, and V17 extend through the hole H31. There is a gap between each of the via conductors V11, V13, V15, and V17 and the side of the hole H31, and the via conductors V11, V13, V15, and V17 therefore extend through the hole H31 without being in contact with the magnetic substance portion MC13. The via conductors V12, V14, V16, and V18 extend through the hole H32. There is a gap between each of the via conductors V12, V14, V16, and V18 and the side of the hole H32, and the via conductors V12, V14, V16, and V18 therefore extend through the hole H32 without being in contact with the magnetic substance portion MC13.

The via conductors V11 to V18 extend through the hole portions H1 to H3 provided in the magnetic core layer MC1 and are thus not in contact with the magnetic core layer MC1. Thus, a current flowing through the via conductors V11 to V18 is prevented from being led to the magnetic core layer MC1. As a result, the direct-current superposition characteristics of the inductor L1 are maintained from departing from desired characteristics.

As illustrated in FIG. 3E, the inductor conductor layer CL2 includes a plurality of line conductors E21 to E24. In FIG. 3E, to facilitate understanding of a connection relationship between the line conductors E21 to E24 and the via conductors V11 to V18, the inductor conductor layer CL2 is drawn so as to be visible therethrough.

The line conductors E21 to E24 are disposed in parallel or substantially in parallel in this order in the Y-axis direction. The line conductor E22 is disposed between the line conductors E21 and E23. The line conductor E23 is disposed between the line conductors E22 and E24. A gap is provided between the line conductors E21 and E22, and the line conductor E21 is therefore not in contact with the line conductor E22. A gap is provided between the line conductors E22 and E23, and the line conductor E22 is therefore not in contact with the line conductor E23. A gap is provided between the line conductors E23 and E24, and the line conductor E23 is therefore not in contact with the line conductor E24.

The via conductors V11 and V12 are connected to the line conductor E21. The via conductors V13 and V14 are connected to the line conductor E22. The via conductors V15 and V16 are connected to the line conductor E23. The via conductors V17 and V18 are connected to the line conductor E24.

In the inductor L1, the magnetic substance portions MC11 to MC13 are interposed and secured between the inductor conductor layers CL1 and CL2 that are secured by the via conductors V11 to V18. An adhesive to secure the inductor conductor layer CL1, the magnetic substance portions MC11 to MC13, and the inductor conductor layer CL2 is unnecessary. No adhesive is likely to be melted by heat generated by a current flowing through the inductor L1 or a temperature of the environment in which the inductor L1 is used.

Thus, a current that is caused to flow to the inductor L1 is able to be made large, and a range of temperatures of the environment in which the inductor L1 may be used is also able to be widened.

Referring to FIGS. 3A and 3E, in the inductor L1, a path extends from the input-output terminal T1 to the input-output terminal T2 through the via conductor V11, the line conductor E21, the via conductor V12, the line conductor E11, the via conductor V13, the line conductor E22, the via conductor V14, the line conductor E12, the via conductor V15, the line conductor E23, the via conductor V16, the line conductor E13, the via conductor V17, the line conductor E24, and the via conductor V18. The path winds around the magnetic core layer MC1.

In the inductor L1, there is a gap (or space) between adjacent conductors included in the path extending from the input-output terminal T1 to the input-output terminal T2, and the adjacent conductors are not in contact with each other. Thus, the conductors included in the path do not have to be covered with a wire material coating. No wire material coating is likely to be melted by heat generated by the flow of a current through the path or a temperature of the environment in which the inductor L1 is used, and the path is unlikely to be shorted at a point thereof. As a result, a current that is caused to flow to the inductor L1 is able to be made large, and a range of temperatures of the environment in which the inductor L1 may be used is also able to be widened.

Figure 4:
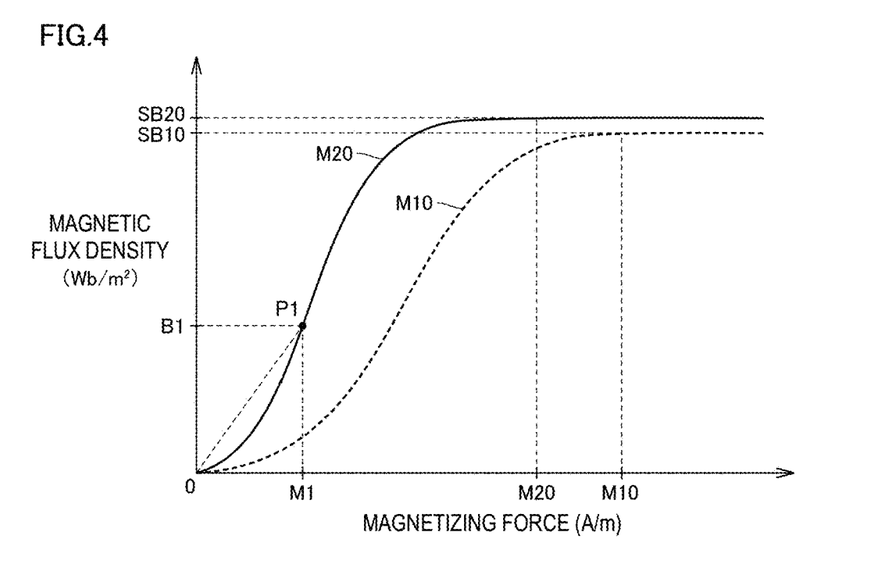
FIG. 4 illustrates magnetization curves of magnetic substances included in a magnetic core layer.

FIG. 4 illustrates a magnetization curve M10 of the magnetic substance MS1 and a magnetization curve M20 of the magnetic substance MS2. In FIG. 4, the horizontal axis represents magnetizing force, and the vertical axis represents magnetic flux density. Magnetizing force refers to magnetic field intensity. When a current that flows through the inductor L1 increases, the magnetizing force also increases. A magnetic permeability of a magnetic substance is a value obtained by dividing a magnetic flux density by a magnetizing force. For example, a magnetic permeability at a point P1 (magnetizing force M1, magnetic flux density B1) on the magnetization curve M20 is B1/M1.

As illustrated in FIG. 4, when the current that flows through the inductor L1 increases and the magnetizing force increases, magnetic flux densities of the magnetic substances MS1 and MS2 also increase and then do not substantially change. A state in which a magnetic flux density does not substantially change as described is referred to as magnetic saturation. A magnetic flux density in the case in which magnetic saturation is occurring is referred to as a saturation magnetic flux density.

In the magnetization curve M10, the magnetic flux density reaches a saturation magnetic flux density SB10 at a magnetizing force M10. In the magnetization curve M20, the magnetic flux density reaches a saturation magnetic flux density SB20 at a magnetizing force M20. The magnetizing force M20 at which the magnetic substance MS2 reaches magnetic saturation is smaller than the magnetizing force M10 at which the magnetic substance MS1 reaches magnetic saturation. That is, with respect to the current that flows through the inductor L1, the magnetic substance MS2 reaches magnetic saturation at a smaller current than the magnetic substance MS1. Currents at which the respective magnetic substances MS1 and MS2 reach magnetic saturation differ from each other, and the magnetic substances MS1 and MS2 therefore differ from each other in magnetic permeability properties.

Figure 5:
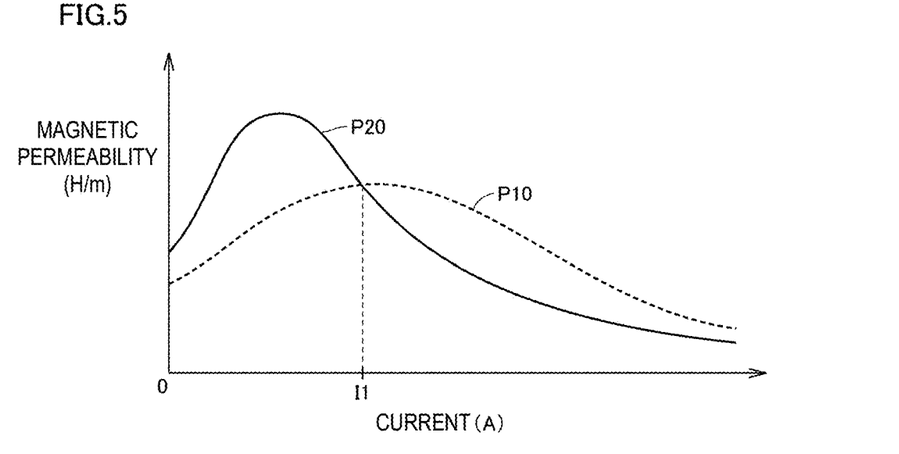
FIG. 5 illustrates magnetic permeability properties of the magnetic substances with respect to a current that flows through the inductor in FIG. 1.

FIG. 5 illustrates properties P10 of the magnetic substance MS1 and magnetic permeability properties P20 of the magnetic substance MS2 with respect to a current that flows through the inductor L1. As illustrated in FIG. 5, when the current is smaller than a current I1, a magnetic permeability of the magnetic substance MS2 is larger than a magnetic permeability of the magnetic substance MS1. On the other hand, when the current is larger than the current I1, the magnetic permeability of the magnetic substance MS1 is larger than the magnetic permeability of the magnetic substance MS2.

As described above, desired direct-current superposition characteristics of the inductor L1 are characteristics in which inductance with respect to a relatively smaller current value (low load region) than the rated current of the DC-DC converter 1 is large and in which inductance with respect to a larger current value (overcurrent region) than the rated current is maintained so as not to fall below a lower limit. The inductance of an inductor increases as a magnetic permeability of a magnetic core increases. Thus, in the inductor L1, the magnetic core layer MC1 includes the magnetic substance MS1 having large inductance in the overcurrent region and the magnetic substance MS2 having large inductance in the low load region, and the desired direct-current superposition characteristics are thereby achieved. A ratio between a thickness of the magnetic substance portion MC11 (MC13) and a thickness of the magnetic substance portion MC12 by which the desired direct-current superposition characteristics are achieved is able to be appropriately determined by simulation or actual machine experiment.

Figure 6:
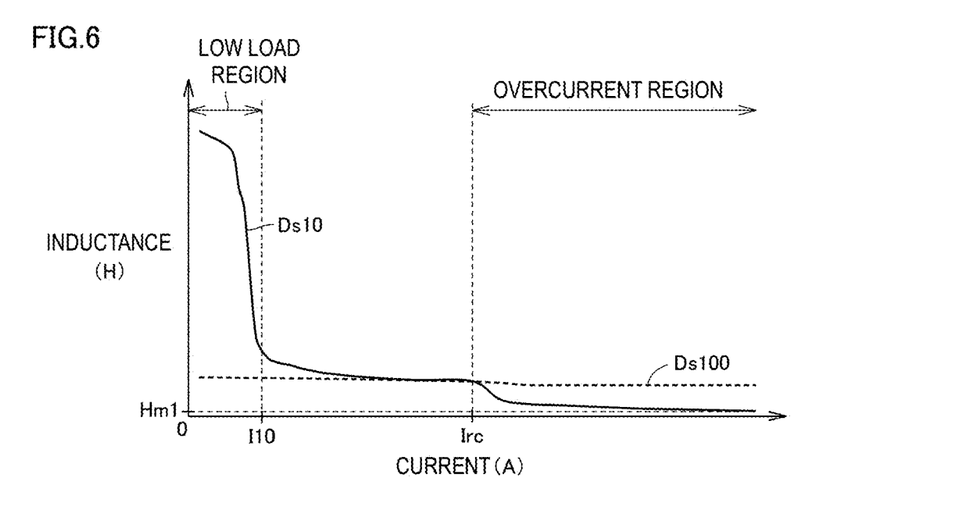
FIG. 6 illustrates simulation results of direct-current superposition characteristics of the inductor according to the Preferred Embodiment 1 of the present invention and simulation results of direct-current superposition characteristics of an inductor according to a comparative example.

FIG. 6 illustrates simulation results of direct-current superposition characteristics Ds10 of the inductor L1 according to Preferred Embodiment 1 and simulation results of direct-current superposition characteristics Ds100 of an inductor according to a comparative example. In FIG. 6, a current Irc represents the rated current of the DC-DC converter 1.

As illustrated in FIG. 6, the inductance of the inductor according to a comparative example does not substantially change with respect to a change in current. The inductor according to the comparative example is designed so that constant inductance is able to be provided with respect to any currents.

On the other hand, in a low load region in which a current is smaller than a current I10, the inductance of the inductor L1 is above the inductance of the inductor according to the comparative example. In an overcurrent region in which the current is larger than the rated current Irc, the inductance of the inductor L1 is below the inductance of the inductor according to the comparative example but is not below a lower limit Hm1. In the inductor L1, the inductance is maintained at not less than the lower limit Hm1 in the overcurrent region.

Figure 7:
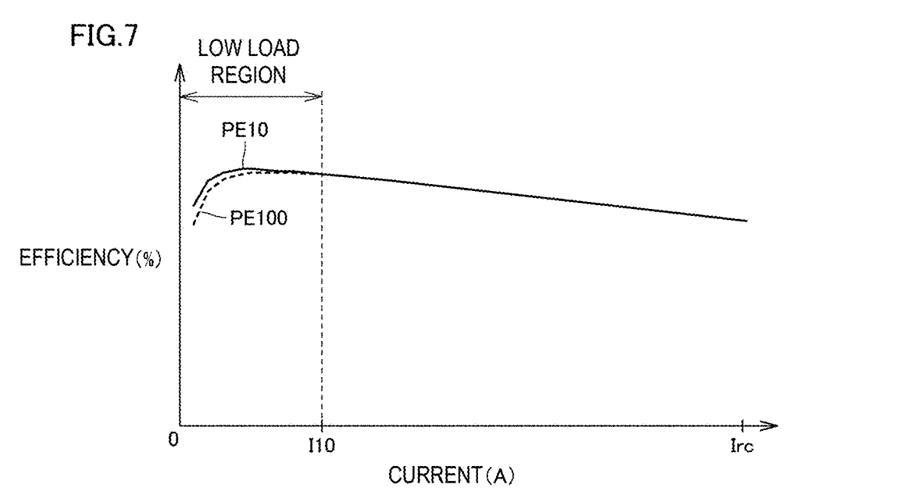
FIG. 7 illustrates power conversion efficiency of the DC-DC converter according to the Preferred Embodiment 1 of the present invention and power conversion efficiency of a DC-DC converter including the inductor according to the comparative example.

FIG. 7 illustrates power conversion efficiency PE10 of the DC-DC converter 1 according to the Preferred Embodiment 1 and power conversion efficiency PE100 of a DC-DC converter including the inductor according to the comparative example. When the power conversion efficiency PE10 and the power conversion efficiency PE100 are compared with each other, in the low load region, since the inductor L1 is larger than the inductor according to the comparative example in inductance, the power conversion efficiency PE10 is above the power conversion efficiency PE100.

An improvement in power conversion efficiency in the low load region reduces power consumption (standby power) of the DC-DC converter 1 that is on standby, during which a current is relatively small. Furthermore, when the inductance is maintained at not less than the lower limit Hm1 in the overcurrent region, an output short circuit is able to be prevented from occurring in the DC-DC converter 1 even if an overcurrent exceeding the rated current flows through the inductor L1. As a result, in the DC-DC converter 1, load response characteristics in which variations in output voltage with respect to changes in current are reduced are able to be maintained for an overcurrent.

In the inductor L1, to achieve the direct-current superposition characteristics Ds10 illustrated in FIG. 6, the magnetic core layer MC1 includes the magnetic substances MS1 and MS2 in appropriate proportions. Direct-current superposition characteristics that are able to be achieved by the inductor according to preferred embodiments of the present invention are not limited to the direct-current superposition characteristics Ds10. When a ratio between thicknesses of a plurality of magnetic substance portions or the type of a magnetic substance is changed, direct-current superposition characteristics other than the direct-current superposition characteristics Ds10 are able to be achieved.

Figure 8:
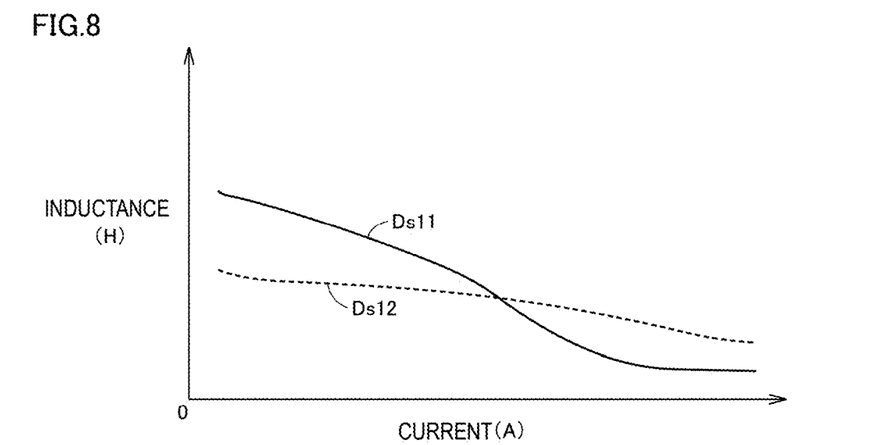
FIG. 8 illustrates changes in direct-current superposition characteristics obtained when a ratio between thicknesses of magnetic substance portions is changed.

FIG. 8 illustrates changes in direct-current superposition characteristics obtained when a ratio between a thickness Tn1 of the magnetic substance portion MC11 (MC13) and a thickness Tn2 of the magnetic substance portion MC12 is changed. In FIG. 8, a curve Dsl1 represents direct-current superposition characteristics obtained when the ratio between the thicknesses Tn1 and Tn2 is one to four. A curve Ds12 represents direct-current superposition characteristics obtained when the ratio between the thicknesses Tn1 and Tn2 is four to one. As illustrated in FIG. 8, when the ratio between the thicknesses of the magnetic substance portions MC11 to MC13 is changed, the direct-current superposition characteristics of the inductor L1 are changed.

Figure 9:
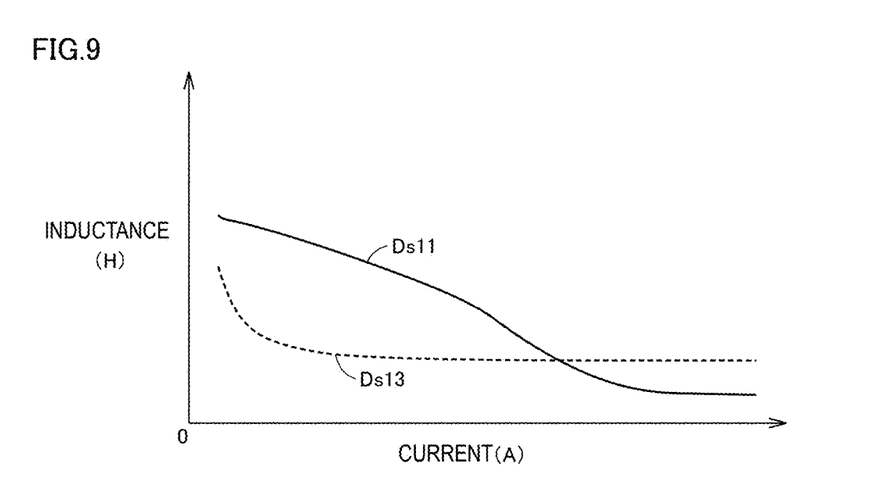
FIG. 9 illustrates changes in direct-current superposition characteristics obtained when a magnetic substance included in a magnetic substance portion is replaced with another magnetic substance.
Figure 10:
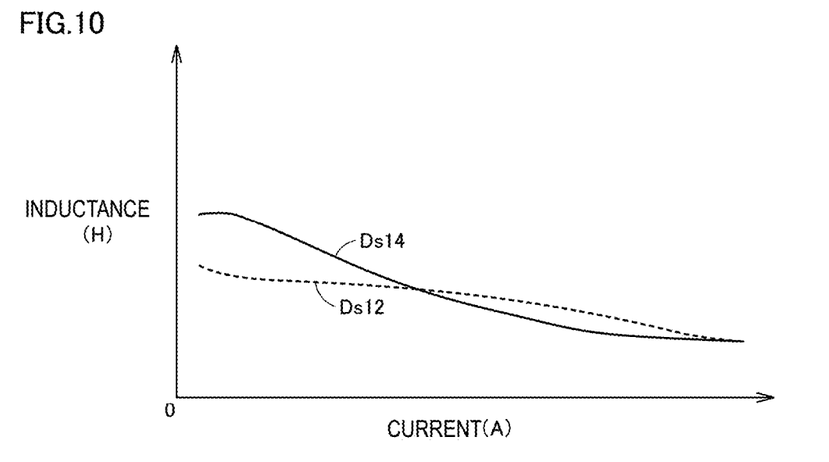
FIG. 10 illustrates changes in direct-current superposition characteristics obtained when a magnetic substance included in a magnetic substance portion is replaced with another magnetic substance.

FIGS. 9 and 10 each illustrate changes in direct-current superposition characteristics obtained when the magnetic substance MS2 included in the magnetic substance portion MC12 is replaced with a magnetic substance MS3. Magnetic properties of the magnetic substance MS3 differ from the magnetic properties of the magnetic substance MS1 and the magnetic properties of the magnetic substance MS2. Direct-current superposition characteristics Ds11 illustrated in FIG. 9 and direct-current superposition characteristics Ds12 illustrated in FIG. 10 are respectively the same as the direct-current superposition characteristics Ds11 and the direct-current superposition characteristics Ds12 that are illustrated in FIG. 8. As illustrated in FIGS. 9 and 10, when the type of a magnetic substance included in the magnetic core layer MC1 is changed, the direct-current superposition characteristics of the inductor L1 are changed.

In the inductor according to the Preferred Embodiment 1, when a ratio between thicknesses of a plurality of magnetic substance portions or the type of a magnetic substance is changed, direct-current superposition characteristics are able to be adjusted to desired direct-current superposition characteristics.

In FIGS. 3A to 3E, the lamination process has been described in which the inductor L1 is formed by laminating the inductor conductor layer CL1, the magnetic core layer MC1, and the inductor conductor layer CL2. When a sheet plate (parent substrate) in which a plurality of identical patterns are formed with a matrix arrangement is used, the same lamination processes as the above-described lamination process are able to be performed simultaneously. The case in which lamination processes in which respective inductors according to the Preferred Embodiment 1 are formed are performed simultaneously will be described below with reference to FIGS. 11 to 14. Furthermore, the case in which DC-DC converters according to a preferred embodiment of the present invention are formed simultaneously will be described with reference to FIGS. 15 and 16.

Figure 11:
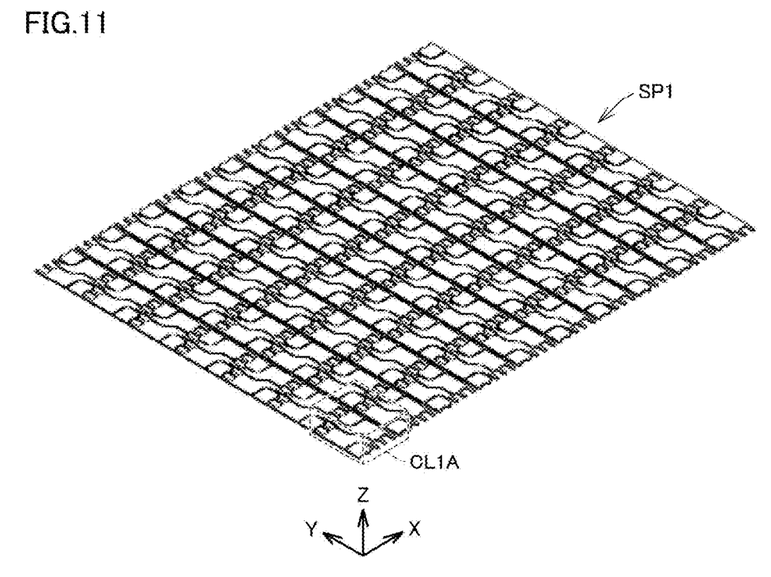
FIG. 11 illustrates a sheet plate in which a plurality of inductor conductor layers are provided.

FIG. 11 illustrates a sheet plate SP1 in which a plurality of inductor conductor layers CL1A are formed. The sheet plate SP1 is molded in one piece using a metal mold. The sheet plate SP1 is parallel or substantially parallel to an X-Y plane. As illustrated in FIG. 11, in the sheet plate SP1, a pattern of an inductor conductor layer CL1A including a plurality of line conductors is repeatedly formed in an X-axis direction and the Y-axis direction. In the sheet plate SP1, a plurality of patterns of the inductor conductor layers CL1A are formed in a matrix.

Figure 12:
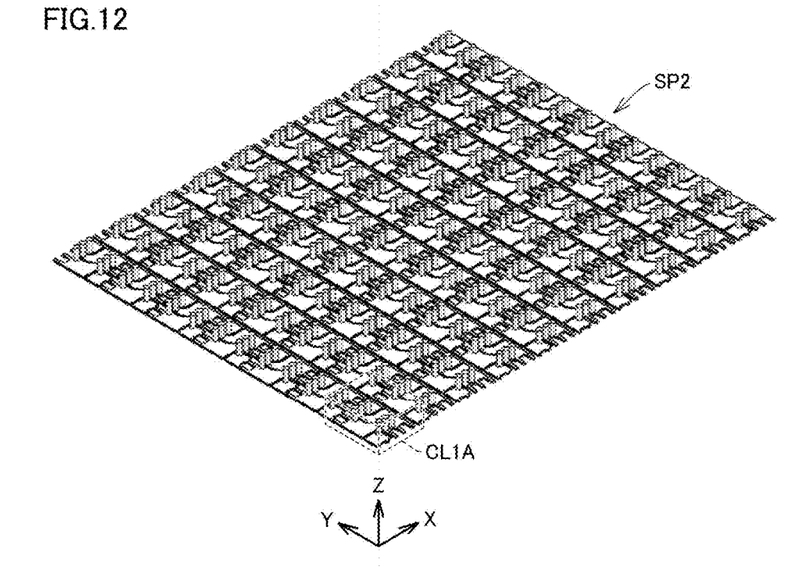
FIG. 12 illustrates a sheet plate obtained by providing a plurality of via conductors in the sheet plate in FIG. 11.

FIG. 12 illustrates a sheet plate SP2 obtained by forming a plurality of via conductors in the sheet plate SP1 in FIG. 11. The plurality of via conductors are molded in one piece using a metal mold. As illustrated in FIG. 12, six via conductors are formed for each inductor conductor layer CL1A to extend in the lamination direction.

Figure 13:
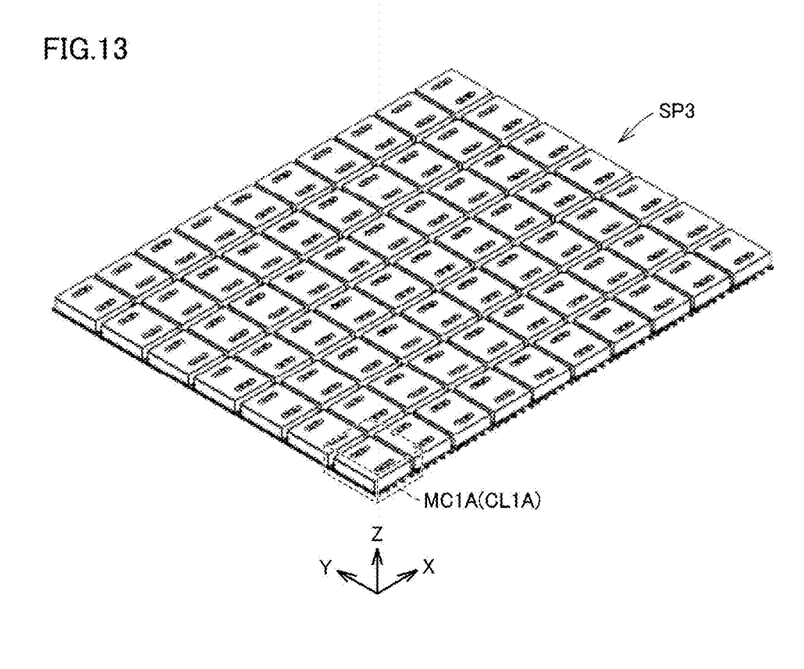
FIG. 13 illustrates a sheet plate obtained by providing a plurality of magnetic core layers in the sheet plate in FIG. 12.

FIG. 13 illustrates a sheet plate SP3 obtained by forming a plurality of magnetic core layers MC1A in the sheet plate SP2 in FIG. 12. The plurality of magnetic core layers MC1A are molded in one piece using a metal mold. As illustrated in FIG. 13, a magnetic core layer MC1A is formed for each of the patterns of the inductor conductor layers CL1A. The magnetic core layer MC1A includes two magnetic substances having magnetic properties different from each other.

Figure 14:
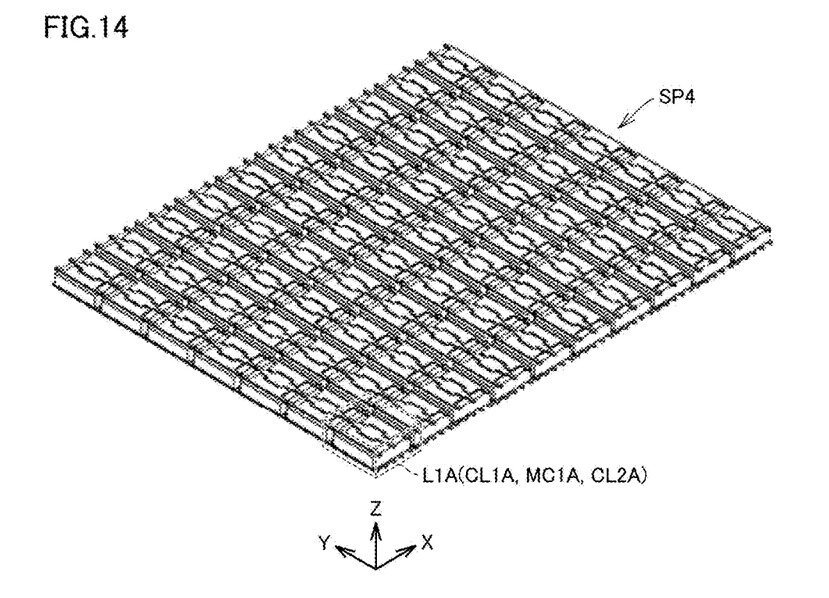
FIG. 14 illustrates a sheet plate obtained by providing a plurality of inductor conductor layers in the sheet plate in FIG. 13.

FIG. 14 illustrates a sheet plate SP4 obtained by forming a plurality of inductor conductor layers CL2A in the sheet plate SP3 in FIG. 13. The plurality of inductor conductor layers CL2A are molded in one piece using a metal mold. As illustrated in FIG. 14, a pattern of an inductor conductor layer CL2A including a plurality of line conductors is repeatedly formed in the X-axis direction and the Y-axis direction. In the sheet plate SP4, a plurality of inductors L1A each including the inductor conductor layer CL1A, the magnetic core layer MC1A, and the inductor conductor layer CL2A that are laminated are arranged in a matrix.

Figure 15:
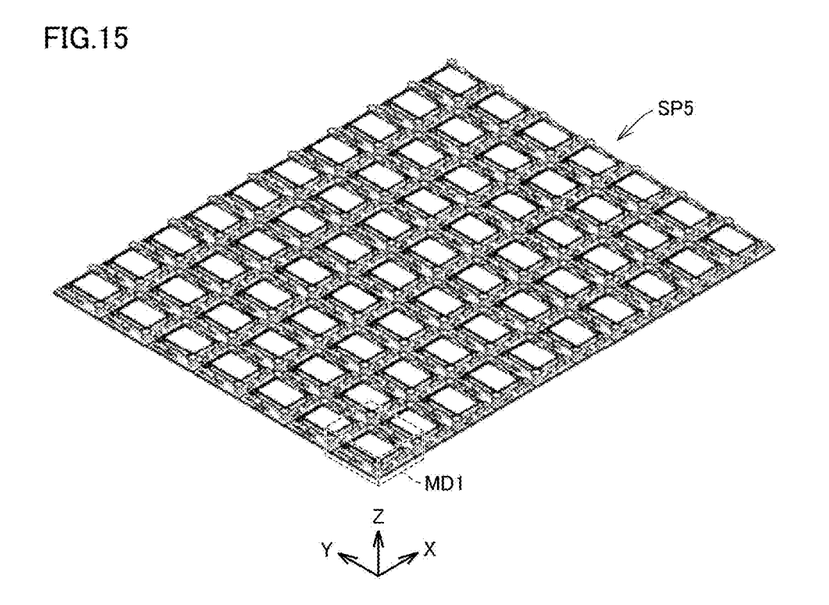
FIG. 15 illustrates a sheet plate in which a plurality of module boards are arranged in a matrix.

FIG. 15 illustrates a sheet plate SP5 in which a plurality of module boards MD1 are formed in a matrix. In a module board MD1, circuit elements of a DC-DC converter 1A other than an inductor L1A are mounted.

Figure 16:
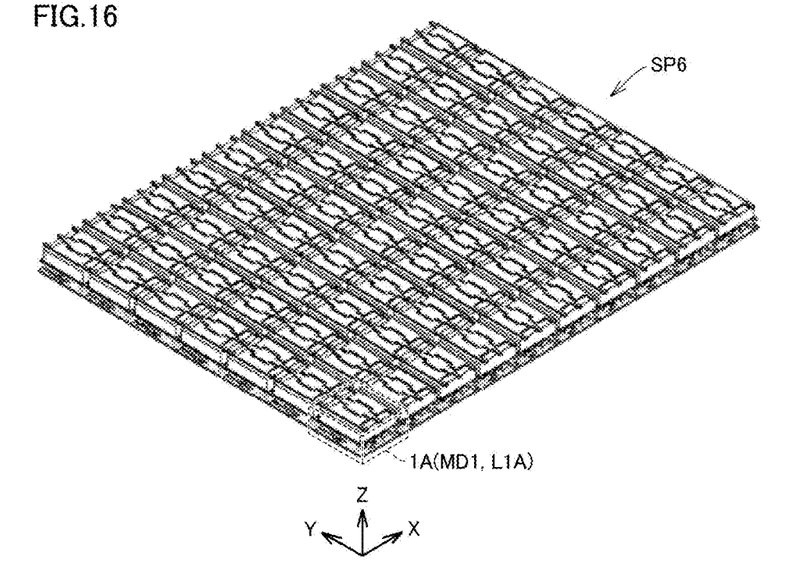
FIG. 16 illustrates a sheet plate obtained by laminating the sheet plate in FIG. 14 to the sheet plate in FIG. 15.

FIG. 16 illustrates a sheet plate SP6 obtained by laminating the sheet plate SP4 in FIG. 14 to the sheet plate SP5 in FIG. 15. As illustrated in FIG. 16, the plurality of inductors L1A are mounted in the plurality of respective module boards MD1, and a plurality of DC-DC converters 1A are thus formed.

With respect to the inductor and the DC-DC converter according to the Preferred Embodiment 1, a plurality of inductors and a plurality of DC-DC converters are able to be manufactured simultaneously under the same manufacturing conditions. Thus, manufacturing variations are able to be reduced, and manufacturing costs are also able to be reduced.

Figure 17:
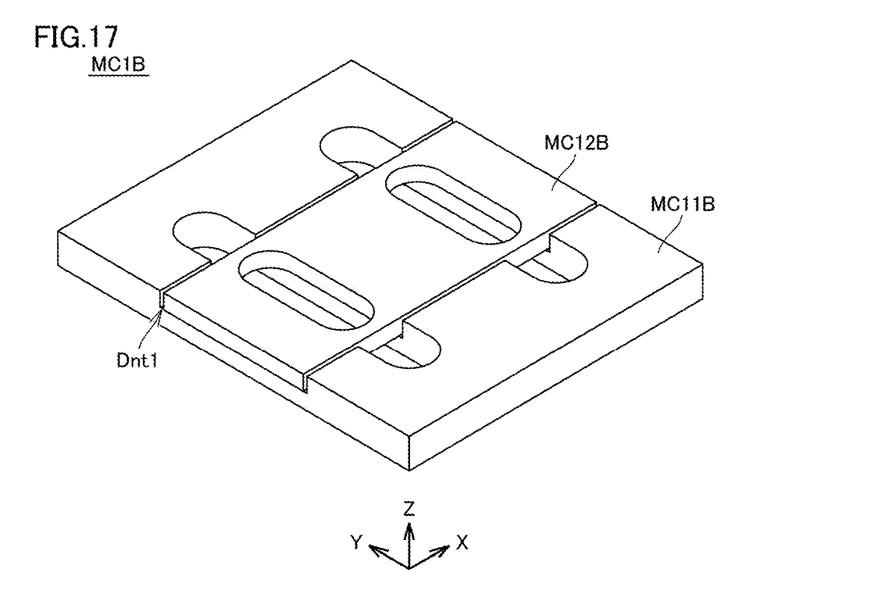
FIG. 17 is an external perspective view of a magnetic core layer of the inductor according to a Modification 1 of the Preferred Embodiment 1 of the present invention.

In the magnetic core layer MC1 of the inductor L1, the magnetic substance portions MC11 to MC13 are laminated in the lamination direction. The structure of the magnetic core layer of the inductor according to preferred embodiments of the present invention may be any structure including two magnetic substance portions that have magnetic properties different from each other and are independent of each other. For example, as in a magnetic core layer MC1B according to a Modification 1 of the Preferred Embodiment 1 illustrated in FIG. 17, in a depression portion (pocket) Dnt1 of a magnetic substance portion MC11B, a magnetic substance portion MC12B having magnetic properties different from those of the magnetic substance portion MC11B may be disposed.

Figure 18:
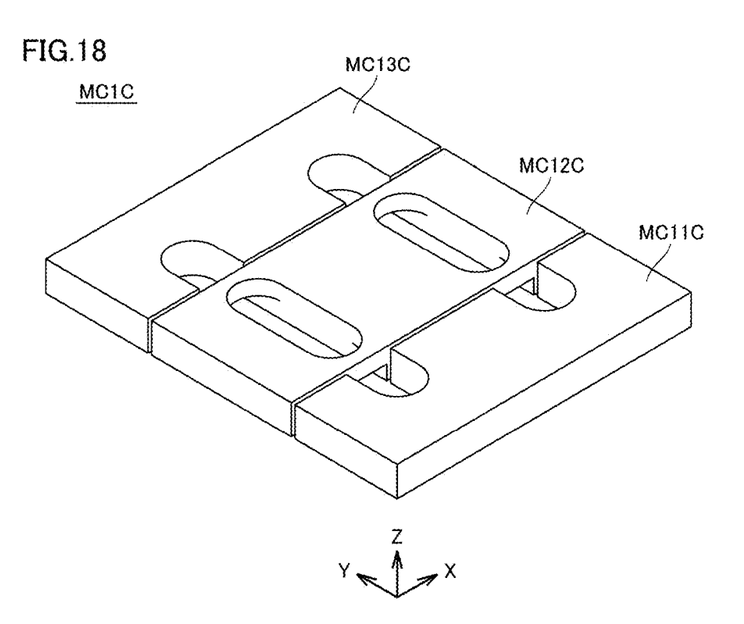
FIG. 18 is an external perspective view of a magnetic core layer of the inductor according to a Modification 2 of the Preferred Embodiment 1 of the present invention.

Furthermore, as in a magnetic core layer MC1C according to a Modification 2 of the Preferred Embodiment 1 illustrated in FIG. 18, magnetic substance portions MC11C to MC13C are disposed in a direction perpendicular or substantially perpendicular to the lamination direction (Z-axis direction), and the magnetic substance portion MC12C may be disposed between the magnetic substance portions MC11C and MC13C that have magnetic properties different from those of the magnetic substance portion MC12C.

In the Preferred Embodiment 1, the case has been described in which the magnetic core layer includes two types of magnetic substances having magnetic properties different from each other. The magnetic core layer according to the present invention may include three or more types of magnetic substances having magnetic properties different from one another.

As described above, the Preferred Embodiment 1, the Modification 1, and the Modification 2 enable a reduction in manufacturing costs of an inductor including a composite magnetic core and a DC-DC converter including the inductor. Furthermore, direct-current superposition characteristics of the inductor are able be adjusted to desired direct-current superposition characteristics.

Preferred Embodiment 2

In the Preferred Embodiment 1, the case has been described in which each inductor conductor layer and the magnetic core layer are in contact with each other. When a current flows from the inductor conductor layer to the magnetic core layer, the direct-current superposition characteristics of the inductor may depart from desired direct-current superposition characteristics. In a Preferred Embodiment 2 of the present invention, the case will be described in which the inductor conductor layer and the magnetic core layer are electrically isolated from each other to prevent a current from flowing from the inductor conductor layer to the magnetic core layer.

The Preferred Embodiment 2 differs from the Preferred Embodiment 1 in that an insulator layer is disposed between the inductor conductor layer and the magnetic core layer. Except for the above, the configuration is the same as or similar to that in the Preferred Embodiment 1, and a repeated description thereof is therefore not provided.

Figure 19A:
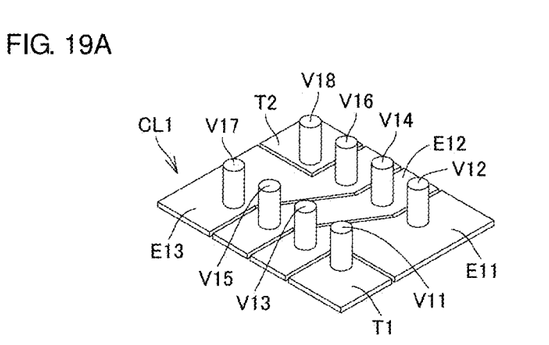
FIGS. 19A to 19D illustrate a lamination process of laminating layers included in an inductor according to a Preferred Embodiment 2 of the present invention.
Figure 19B:
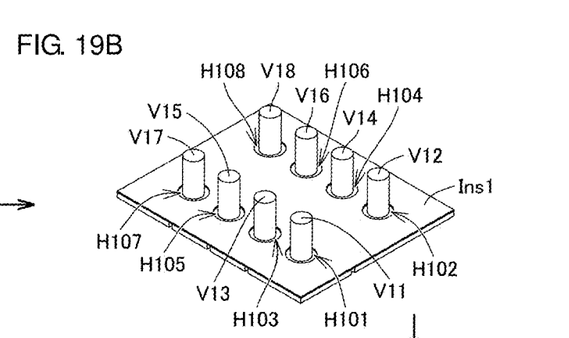

FIGS. 19A to 19D illustrate a lamination process of laminating layers included in an inductor L2 according to the Preferred Embodiment 2. FIG. 19A is the same or substantially the same as FIG. 3A. As illustrated in FIG. 19B, an insulator layer Ins1 is laminated to the inductor conductor layer CL1. In the insulator layer Ins1, holes H101 to H108 are formed. The via conductors V11 to V18 extend through the respective holes H101 to H108. A process in which the magnetic substance portions MC11 to MC13 are laminated to the insulator layer Ins1 is the same or substantially the same as a process illustrated in FIGS. 3B to 3D, and a repeated description thereof is therefore not provided.

Figure 19C:
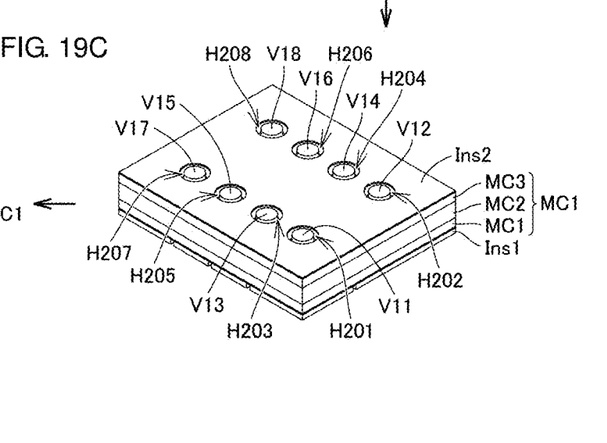
Figure 19D:
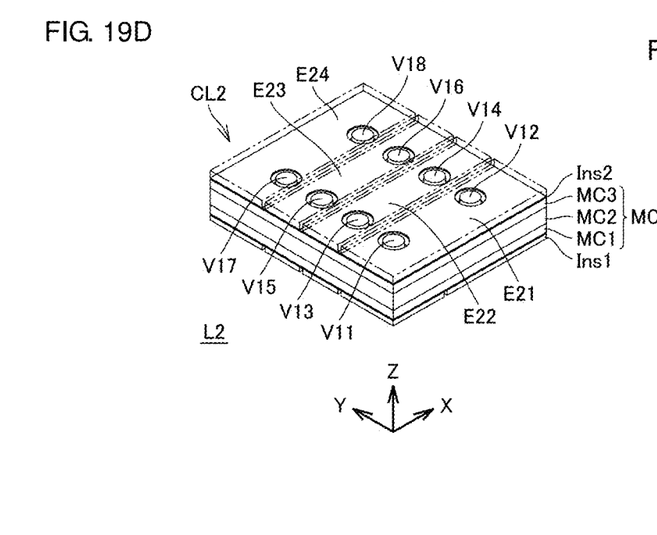

As illustrated in FIG. 19C, an insulator layer Ins2 is laminated on the magnetic substance portion MC13. In the insulator layer Ins2, holes H201 to H208 are formed. The via conductors V11 to V18 extend through the respective holes H201 to H208. As illustrated in FIG. 19D, the inductor conductor layer CL2 is laminated to the insulator layer Ins2.

As described above, the Preferred Embodiment 2 is also able to achieve the same or substantially the same advantageous effects as the Preferred Embodiment 1. Furthermore, in the Preferred Embodiment 2, when an insulator layer is disposed between each inductor conductor layer and the magnetic core layer, the inductor conductor layer and the magnetic core layer are electrically isolated from each other. Thus, a current is able to be prevented from flowing from the inductor conductor layer to the magnetic core layer. As a result, the direct-current superposition characteristics of the inductor is able to be maintained from departing from desired characteristics.

The preferred embodiments of the present invention disclosed herein are appropriately combined within the range in which no inconsistencies are generated, and a combined preferred embodiment is able to be implemented. The preferred embodiments disclosed herein are to be considered illustrative and not restrictive in any respect. The scope of the present invention is defined not by the above descriptions, but by the claims, and is intended to include all changes made within the meaning and scope equivalent to the claims.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An inductor comprising:
   a first terminal and a second terminal;
   a first inductor conductor layer and a second inductor conductor layer;
   a magnetic core layer disposed between the first inductor conductor layer and the second inductor conductor layer; and
   a first via conductor and a second via conductor connected to the first inductor conductor layer and the second inductor conductor layer; wherein
   the first terminal and the second terminal are electrically connected through the first via conductor and the second via conductor;
   the magnetic core layer includes a first magnetic substance portion including a first magnetic substance, and a second magnetic substance portion including a second magnetic substance that is different from the first magnetic substance in magnetic properties;
   the magnetic core layer includes a hole portion through which the first via conductor and the second via conductor extend;
   the first inductor conductor layer covers a portion of one surface of the magnetic core layer, and another portion of the one surface of the magnetic core layer is exposed from the first inductor conductor layer; and
   an area of the portion of the one surface of the magnetic core layer that is covered by the first inductor conductor layer is greater than an area of the another portion of the one surface of the magnetic core layer that is exposed from the first inductor conductor layer.

2. The inductor according to claim 1, wherein
   each of the first via conductor and the second via conductor is not connected to the magnetic core layer.

3. The inductor according to claim 1, wherein
   the magnetic core layer further includes a third magnetic substance portion including the first magnetic substance; and
   the second magnetic substance portion is disposed between the first magnetic substance portion and the third magnetic substance portion.

4. The inductor according to claim 3, wherein
the first magnetic substance portion is disposed between the second magnetic substance portion and the first inductor conductor layer; and
the third magnetic substance portion is disposed between the second magnetic substance portion and the second inductor conductor layer.

5. The inductor according to claim 1, further comprising:
a first insulator layer disposed between the magnetic core layer and the first inductor conductor layer; and
a second insulator layer disposed between the magnetic core layer and the second inductor conductor layer.

6. The inductor according to claim 1, wherein the magnetic properties are at least one of magnetic permeability, magnetic saturation, and saturation magnetic flux density.

7. The inductor according to claim 1, wherein the first inductor conductor layer includes line conductors disposed between the first and second terminals.

8. The inductor according to claim 7, wherein gaps are provided between the line conductors and the first and second terminals.

9. The inductor according to claim 1, wherein the second inductor conductor layer includes line conductors.

10. The inductor according to claim 9, wherein the line conductors are parallel or substantially parallel to each other.

11. A DC-DC converter comprising a choke coil of a chopper circuit including the inductor according to claim 1.

12. The DC-DC converter according to claim 11, wherein each of the first via conductor and the second via conductor is not connected to the magnetic core layer.

13. The DC-DC converter according to claim 11, wherein the magnetic core layer further includes a third magnetic substance portion including the first magnetic substance; and
the second magnetic substance portion is disposed between the first magnetic substance portion and the third magnetic substance portion.

14. The DC-DC converter according to claim 13, wherein
the first magnetic substance portion is disposed between the second magnetic substance portion and the first inductor conductor layer; and
the third magnetic substance portion is disposed between the second magnetic substance portion and the second inductor conductor layer.

15. The DC-DC converter according to claim 11, further comprising:
a first insulator layer disposed between the magnetic core layer and the first inductor conductor layer; and
a second insulator layer disposed between the magnetic core layer and the second inductor conductor layer.

16. The DC-DC converter according to claim 11, wherein the magnetic properties are at least one of magnetic permeability, magnetic saturation, and saturation magnetic flux density.

17. The DC-DC converter according to claim 11, wherein the first inductor conductor layer includes lines conductors disposed between the first and second terminals.

18. The DC-DC converter according to claim 17, wherein gaps are provided between the line conductors and the first and second terminals.

19. The DC-DC converter according to claim 11, wherein the second inductor conductor layer includes line conductors.

20. The DC-DC converter according to claim 19, wherein the line conductors are parallel or substantially parallel to each other.

* * * * *